(12) United States Patent
Farchi et al.

(10) Patent No.: US 7,793,263 B2
(45) Date of Patent: Sep. 7, 2010

(54) DECISION SUPPORT TOOL FOR INTERLEAVING REVIEW SOFTWARE TESTING

(75) Inventors: Eitan Daniel Farchi, Pardes Hana (IL); Ziv Glazberg, Haifa (IL); Ishai Rabinovitz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 11/345,882

(22) Filed: Feb. 2, 2006

(65) Prior Publication Data

US 2007/0180430 A1  Aug. 2, 2007

(51) Int. Cl.
*G06F 9/44* (2006.01)

(52) U.S. Cl. ................................... 717/126
(58) Field of Classification Search ............ 717/126
See application file for complete search history.

(56) References Cited

U.S. PATENT DOCUMENTS

| | | | |
|---|---|---|---|
| 5,953,530 A * | 9/1999 | Rishi et al. | 717/127 |
| 6,851,075 B2 * | 2/2005 | Ur et al. | 714/36 |
| 6,928,449 B2 * | 8/2005 | Ten-Hove et al. | 707/102 |
| 7,316,005 B2 * | 1/2008 | Qadeer et al. | 717/131 |
| 7,549,150 B2 * | 6/2009 | Yu | 718/108 |
| 7,574,697 B2 * | 8/2009 | Biberstein et al. | 717/130 |
| 2003/0131283 A1 * | 7/2003 | Ur et al. | 714/36 |
| 2005/0177775 A1 * | 8/2005 | Qadeer et al. | 714/38 |
| 2006/0248515 A1 * | 11/2006 | Qadeer et al. | 717/127 |
| 2007/0234070 A1 * | 10/2007 | Horning et al. | 713/190 |

OTHER PUBLICATIONS

Farchi et al., "Concurrent Bug Patterns and How to Test Them", PADTAD 2003.
Hayardeny et al. "Concurrent and Distributed Desk Checking," Workshop on Parallel and Distributed Systems: Testing and Debugging, Santa Fe, New Mexico, Apr. 30, 2004 (PADTAD 2004).
ConcurrentTesting (ConTest), details available at www.alphaworks.ibm.com/tech/contest.
Hoare, "Structured Programming in Introductory Programming Courses," Infotech International State of the Art Report on Structured Programming, 1976, and 255-263.
Johnston, Howard, *Learning to Program*, Section 9.4 (pp. 166-180), Prentice Hall International Series in Computer Science, C.A.R. Hoare, ed., 1985.

* cited by examiner

*Primary Examiner*—Anna Deng

(57) ABSTRACT

A computer-implemented method for reviewing software includes monitoring a review session held by one or more reviewers for locating errors in a computer program, and automatically detecting a suggestion-triggering event in the monitored session. A suggested action predicted to increase a likelihood of locating the errors is determined based on known bug patterns responsively to the detected suggestion-triggering event. The suggested action is applied in an execution of the review session.

19 Claims, 2 Drawing Sheets

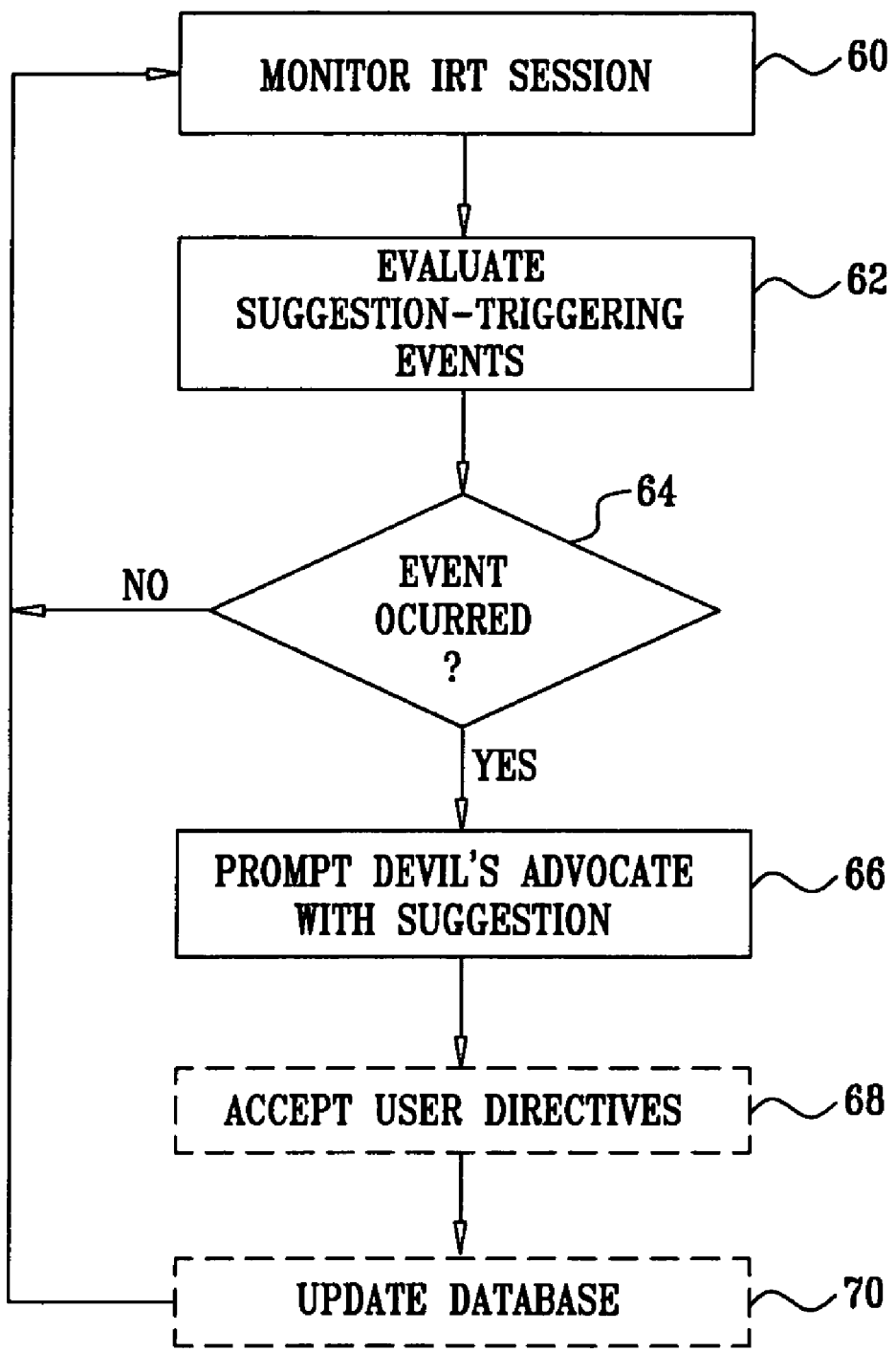

DECISION SUPPORT TOOL FOR INTERLEAVING REVIEW SOFTWARE TESTING

FIELD OF THE INVENTION

The present invention relates generally to software review and testing, and particularly to methods and systems for assisting a software reviewer in making decisions when reviewing concurrent and distributed software programs.

BACKGROUND OF THE INVENTION

Several methods and tools are known in the art for discovering program errors ("bugs") in parallel or concurrent software programs. For example, IBM Corp. (Armonk, N.Y.) offers a tool called ConcurrentTesting (ConTest) for exposing and eliminating concurrency-related bugs in parallel and distributed Java™ programs. Additional details regarding ConTest are available at www.alphaworks.ibm.com/tech/contest.

In some cases, program errors can be found using a desk checking process. Desk checking is a manual process, in which one or more reviewers go through a software program in order to locate program errors. In some cases, desk checking can be performed in the early stages of software design, before the entire software code is available. Manual desk checking techniques are described, for example, by Hoare in "Structured Programming in Introductory Programming Courses," Infotech International State of the Art Report on Structured Programming, 1976, pages 255-263.

The desk checking concept was extended to concurrent and distributed software programs by Hayardeny et al. in a paper entitled "Concurrent and Distributed Desk Checking," Workshop on Parallel and Distributed Systems: Testing and Debugging, Santa Fe, N. Mex., Apr. 30, 2004 (PADTAD 2004).

SUMMARY OF THE INVENTION

There is therefore provided, in accordance with an embodiment of the present invention, a computer-implemented method for reviewing software. A review session held by one or more reviewers for locating errors in a computer program is monitored. A suggestion-triggering event is automatically detected in the monitored session. A suggested action predicted to increase a likelihood of locating the errors is determined based on known bug patterns responsively to the detected suggestion-triggering event. The suggested action is applied in an execution of the review session.

Other embodiments of the present invention provide a system, decision support tool and computer software product that use similar methods.

The present invention will be more fully understood from the following detailed description of the embodiments thereof, taken together with the drawings in which:

BRIEF DESCRIPTION OF THE DRAWINGS

FIG. 2 is a flow chart that schematically illustrates a method for decision support for software review, in accordance with an embodiment of the present invention.

DETAILED DESCRIPTION OF EMBODIMENTS

Overview

Figure 1:
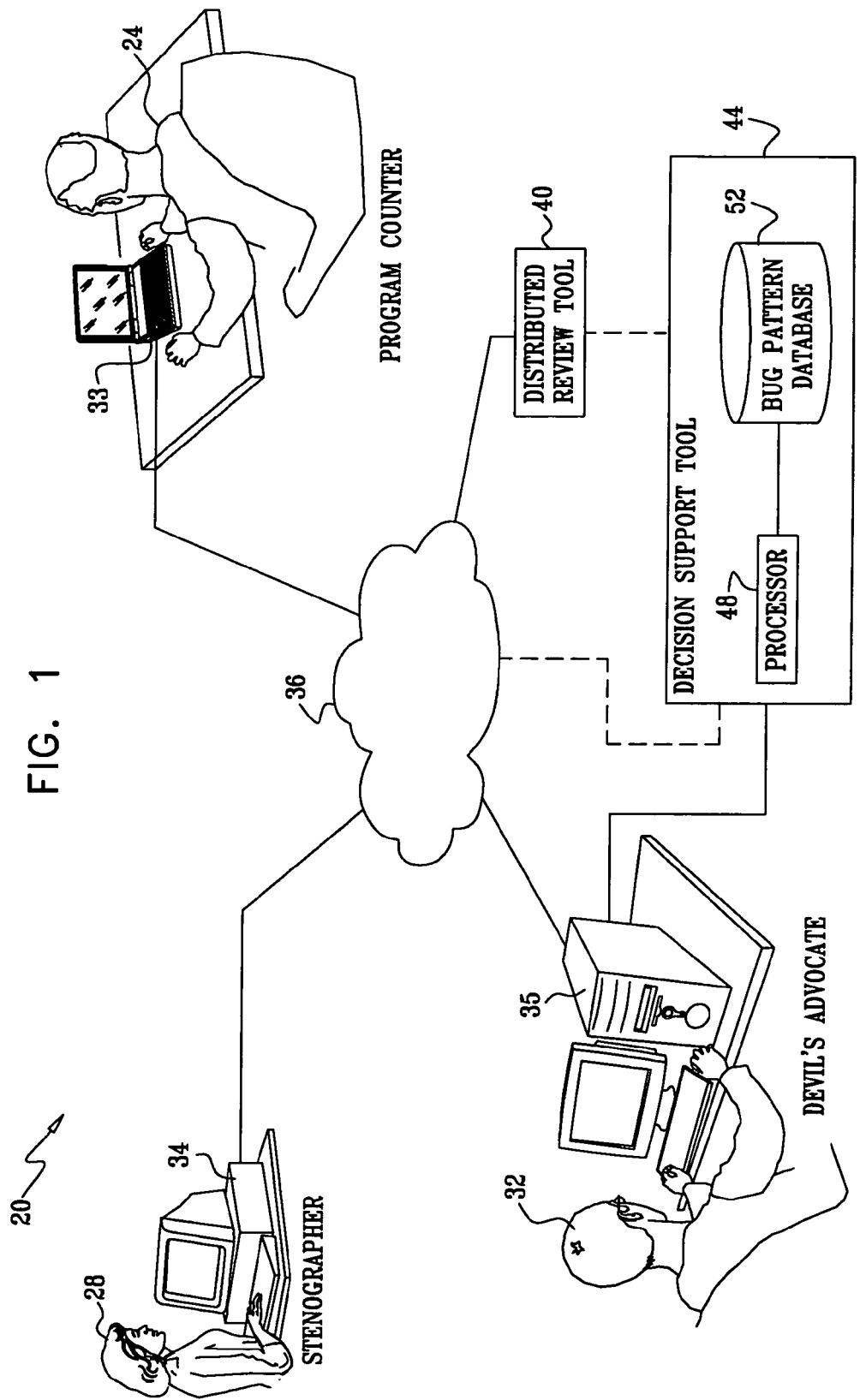
FIG. 1 is a block diagram that schematically illustrates a system for software review, in accordance with an embodiment of the present invention.

Concurrent computer programs possess several unique characteristics that complicate their review. Concurrent programs typically comprise two or more threads running asynchronously of one another. Different threads may simultaneously access shared system resources or perform synchronization-related events. Such events, which are types of concurrent events (as defined hereinbelow), are particularly sensitive to program errors, most of which cannot be discovered by examining each thread separately.

Moreover, each run of the concurrent program may result in a different sequence of concurrent events, referred to herein as different "interleavings." The different interleavings are created by different scheduling of the threads, as well as by other system- or environment-related effects. Program errors may come into effect in some interleavings and remain hidden in others. However, since the total number of possible interleavings is extremely large even for programs of modest complexity, it is usually impractical to review all possible interleavings.

The paper by Hayardeny et al. cited above describes a desk checking process used for reviewing concurrent programs. The process is carried out by two or more reviewers, one of whom plays the role of a "devil's advocate." The devil's advocate is responsible for controlling the program flow of the reviewed interleavings, so as to increase the likelihood of discovering program errors. As will be shown below, the devil's advocate role is a complex task involving significant heuristic knowledge. The reviewer playing this role should typically be an experienced programmer, having good intuition coupled with a deep understanding of concurrent bug patterns and of the operating system and computer system used. Many software programmers, and in particular beginner programmers, do not possess such skills.

Thus, in order to improve the effectiveness of concurrent program desk checking processes, embodiments of the present invention provide decision support methods and tools that assist the reviewer acting as devil's advocate in his or her decision making process. In some embodiments, a decision support tool monitors the status of a review session held by one or more reviewers for locating bugs in a concurrent computer program. Responsively to the monitored session status, the tool uses a database of known bug patterns to produce suggestions for actions to be taken by the reviewer with regard to the execution of the desk checking session. Typically, the suggested actions are predicted to increase the likelihood of locating the program errors, such as actions increasing the contention on shared system resources or actions reconstructing known bug patterns.

The methods and tools described hereinbelow improve the performance of skilled reviewers, as well as enabling less skilled or inexperienced reviewers to play the devil's advocate role effectively. In addition, using the disclosed decision support tool typically expedites the process of gaining valuable intuition and experience by an inexperienced reviewer. Thus, the use of the decision support tool described hereinbelow enables common and widespread use of desk checking methods for reviewing concurrent programs. Such widespread use was until now limited due to the required skill and experience.

Reviewing Concurrent Programs

In contrast to sequential programs, concurrent, distributed and/or fault tolerant computer programs (collectively referred to hereinbelow as "concurrent programs") have several unique characteristics that complicate their review and debugging. Concurrent programs typically comprise a number of software threads that run asynchronously of one another. An operating system that runs the concurrent program handles thread scheduling and switching, i.e., alternates the processing of the different threads.

In many cases, concurrent events occur during the execution of a concurrent program. Concurrent events are events that influence two or more different threads, typically involving thread interaction with common system resources. For example, a concurrent event may occur when different threads simultaneously access a shared memory. Other examples of concurrent events involve synchronization-related events, such as reading from a socket and obtaining or releasing locks on resources by different threads. Concurrent events are particularly sensitive to program errors, some of which cannot be discovered by examining each thread separately.

Moreover, in each run of a concurrent program, a different sequence of concurrent events may occur, for example due to a different thread scheduling sequence performed by the operating system. Differences between concurrent event sequences may also be caused by system effects such as network delays, interrupts and system failures. The different possible sequences of concurrent events, referred to herein as "interleavings," make concurrent programs behave non-deterministically, in the sense that different runs of the same program operating on the same input may result in different sequences of concurrent events. Obviously, some program errors may come into effect only in particular interleavings and remain hidden in others.

In general, the total number of possible interleavings grows exponentially with the number of threads multiplied by the number of concurrent events in each thread. Thus, reviewing or testing of all possible interleavings is impractical even for programs of modest complexity.

In the paper "Concurrent and Distributed Desk Checking" cited above the authors propose a review process that addresses the difficulties associated with reviewing and exposing errors in concurrent and distributed software programs. According to the proposed process, a plurality of interleavings is selected and executed manually by one or more reviewers in a review session. The review session is referred to herein as an Interleaving Review Testing (IRT) session.

Typically, interleavings are selected so as to emphasize contentions on shared system resources. Interleavings can also be selected based on known concurrent bug patterns (i.e., event sequences that are known to be likely to cause bugs). Methods for deriving and using concurrent bug patterns are described, for example, by Farchi et al. in "Concurrent Bug Patterns and How to Test Them," Workshop on Parallel and Distributed Systems: Testing and Debugging, Nice, France, Apr. 22-26, 2003 (PADTAD 2003), which is incorporated herein by reference. Several exemplary concurrent bug patterns are described further below.

The reviewers in the IRT session are assigned three roles, namely "program counter," "devil's advocate" and "stenographer." The program counter, often played by the program owner, is responsible for executing the control flow of the interleaving being reviewed. The stenographer is responsible for updating, presenting and documenting the system states (e.g., variable values) during the session.

The devil's advocate has two major roles, before and during the IRT session. In preparation for the session, the devil's advocate is responsible for making sure that the selected interleavings contain sufficient contentions on common resources and other concurrent events to make them effective in exposing potential program errors. On the other hand, the number of interleavings should be kept sufficiently small and manageable so that the session can be completed in a reasonable time.

During the session, the devil's advocate's role is to make decisions and take actions regarding the execution of the interleaving, in order to increase the likelihood of discovering program errors. Some of the decisions and actions relate to switching and scheduling of threads. Other decisions and actions relate to introducing system-related and environment-related effects, such as network delays, failures and interrupts. The devil's advocate may stop the execution of the interleaving at any given time and perform an action related to the decision. The devil's advocate may decide, for example, to delay a particular thread with respect to another thread, to defer the processing of a particular thread, to resume processing of a thread, to simulate a communication failure between nodes, or to simulate a server failure.

The devil's advocate may also delay lock and release operations on shared resources, so that locks are obtained and released in different orders. In other cases, the devil's advocate may force error conditions and error paths, force the use of blocked operations, and generate different external signals and interrupts, as well as simulate different scenarios of waiting on events. The devil's advocate may also test assumptions related to the hardware, the operating system or the memory model used.

Additionally or alternatively to the exemplary decisions and actions listed above, the devil's advocate may take any other suitable decision and perform any other suitable action that affects the execution of the interleaving. Typically but not necessarily, the decisions and actions taken by the devil's advocate are aimed at causing contentions on common resources and at causing known concurrent bug patterns.

It is evident from the description above that the effectiveness of an IRT session in exposing program errors depends to a large extent on the experience, skill and performance of the devil's advocate. To perform well, the devil's advocate should be an experienced reviewer, having good intuition and a good knowledge of bug patterns, coupled with deep understanding of the operating system and computer system used. In practical cases, however, many software programmers, and in particular beginner programmers, do not possess such skills. The devil's advocate role is an "acquired art" involving significant heuristic knowledge.

In order to improve the effectiveness of IRT sessions, embodiments of the present invention provide decision support methods and tools for assisting the devil's advocate during the IRT session.

System Description

FIG. 1 is a block diagram that schematically illustrates a system 20 for software review, in accordance with an embodiment of the present invention. Three reviewers playing the roles of a program counter 24, a stenographer 28 and a devil's advocate 32 hold an IRT session, in accordance with the IRT process described above. The three reviewers interact with one another and with system 20 using reviewer terminals, namely a program counter terminal 33, a stenographer terminal 34 and a devil's advocate terminal 35.

In the exemplary configuration of FIG. 1, system 20 comprises a distributed review system, in which the reviewers are physically located at different locations. In some embodiments, the reviewers communicate with one another over a communication network 36, which may comprise the Internet, a local area network (LAN) or any other suitable communication medium. In alternative embodiments the reviewers may be collocated and communicate locally.

In some embodiments, the IRT session is held with the assistance of a distributed review tool 40. The review tool performs functions such as tracing and displaying the current system state of the reviewed interleaving, simulating system hardware and other environmental effects relevant to the reviewed program, tracing the usage of shared resources by the reviewed program, accepting input from the reviewers, backtracking to earlier stages of the review when errors are found, documentation of the session and handling of communication among the reviewers.

In alternative embodiments, tool 40 can also be used when all reviewers are collocated in the same physical location. Further alternatively, the IRT session may be held without the assistance of review tool 40 altogether.

System 20 comprises a decision support tool 44, which monitors the IRT session and assists the reviewer acting as devil's advocate in his or her decision making. In some embodiments, tool 44 is integrated as part of review tool 40. Alternatively, tool 44 may be an independent tool that communicates with tool 40, possibly sharing some of its functions.

Further alternatively, tool 44 may be an independent tool used by the devil's advocate. For example, the decision support functionality of tool 44 may also be used to enhance the debugging of a concurrent software program code running on the target system itself. During the debugging session, different interleavings are explored by the debugging system, taking into consideration recommendations made by tool 44. In some embodiments, tool 44 can be operated in conjunction with a concurrent software debugging tool such as ConTest, cited above. The debugging tool can be used, for example, for causing a particular interleaving, or an action recommended by tool 44, to occur in the target system. The debugging tool can also be used for checking whether a particular interleaving of interest actually occurs in the target system.

Tool 44 comprises a decision processor 48, which performs the different processing tasks described below. Typically, processor 48 comprises a general-purpose computer, which is programmed in software to carry out the functions described herein. The software may be downloaded to processor 48 in electronic form, over a network, for example, or it may alternatively be supplied to the processor on tangible media, such as CD-ROM.

Tool 44 comprises a bug pattern database 52, which holds records of previously-known bug patterns. In some embodiments, the known bug patterns are stored a-priori in database 52 as a result of prior knowledge regarding the computer system, operating system and/or programming language used. The bug patterns may be either generic or specific to the particular type of program being reviewed. Processor 48 of tool 44 uses the known bug pattern database, as will be explained in detail hereinbelow, to prompt devil's advocate 32 with suggestions for actions he or she should take in order to increase the likelihood of discovering bugs.

In comparison with the skill and experience of a human reviewer, the automated use of the known bug pattern database enables the decision support tool to make suggestions based on an updated and comprehensive knowledge base of bug patterns that accumulates the skill and experience of many reviewers accumulated over many (automated and/or manual) review sessions. Furthermore, the automated tool can often detect and classify critical events in the session more accurately and reliably than a human reviewer, in particular when there are many threads and/or shared resources involved.

Decision Support Method Description

FIG. 2 is a flow chart that schematically illustrates a method for decision support for software review, in accordance with an embodiment of the present invention. The method is carried out by decision support tool 44 in the course of an IRT session that reviews a particular interleaving of a concurrent software program.

The method begins with tool 44 monitoring the status of the IRT session, at a monitoring step 60. In some embodiments, tool 44 accepts data regarding the status of the session from review tool 40. Alternatively, tool 44 may track the status of the session independently, such as by using input accepted from the reviewers.

Processor 48 of tool 44 analyzes the current status of the session in order to determine suggestion-triggering events, at an event evaluation step 62. In some embodiments, processor 48 continually examines the program location of each active thread in the interleaving being reviewed. Additionally or alternatively, processor 48 tracks the usage of shared resources and media by the different threads. If the session status is indicative of a critical event, for example a shared variable access or a synchronization-related event, processor 48 declares this event as a suggestion-triggering event.

As another example, processor 48 may detect an event in which a certain shared resource is being modified or is about to be modified. Such an event can also be declared a decision-triggering event, since it is often likely to reveal bugs. Additionally or alternatively, processor 48 can use any other suitable criteria for declaring decision-triggering events responsively to the status of the monitored interleaving.

In some embodiments, the definition and/or classification of events as suggestion-triggering events are performed a-priori and the definitions are stored in database 52. If no suggestion-triggering event is detected, as checked at a checking step 64, the method returns to monitoring step 60 above and tool 44 continues to monitor the IRT session.

Once a suggestion-triggering event is detected, tool 44 produces a suggestion for an action to be taken with regard to the execution of the session, and provides the suggestion to the reviewer acting as devil's advocate, at a suggesting step 66. The suggestion is typically for an action that is predicted to increase the likelihood of revealing bugs. Often, the suggested action increases the contention on shared resources among different threads.

In some embodiments, the suggested action may comprise scheduling-related actions such as switching from processing the current thread to processing another thread, freezing the current thread and returning to a particular thread. Additionally or alternatively, the action may comprise a system- or environment-related action, such as introducing a network delay or system failure. The suggested action may alternatively involve delaying or advancing lock and/or release operations on shared resources. Additionally or alternatively, the suggested action may comprise any other suitable action that can be taken by the devil's advocate with regard to the execution of the interleaving under review. Several examples showing specific suggestion-triggering events and related suggestions and actions are described further below.

In some embodiments, tool 44 automatically interrupts the progress of the IRT session when generating a suggestion. In alternative embodiments, tool 44 enables the review session to continue uninterrupted and lets the devil's advocate decide whether or not to stop the review and perform the suggested action.

In some embodiments, processor 48 of tool 44 determines the suggestion responsively to the known bug patterns stored in bug pattern database 52. For example, processor 48 may identify the suggestion-triggering event as matching one of the known bug patterns. In such a case, the processor will typically determine an action which, if taken, will continue the event sequence defined by the known bug pattern, thus increasing the likelihood of discovering the bug. In some embodiments, the suggestion comprises a sequence of actions aimed at reconstructing a known bug pattern.

In some embodiments, processor 48 chooses a particular bug pattern to focus on. The chosen bug pattern typically comprises a sequence of thread switches, freezes and threads to return to. In these embodiments, processor 48 may sometimes suggest to refocus on a new bug pattern different from the currently-used pattern, if it predicts the new bug pattern has a higher likelihood of revealing bugs.

In some embodiments, tool 44 indicates the current bug pattern being followed to the devil's advocate. The displayed bug patterns provide the devil's advocate with insight as to the reasons behind the suggestions made by the tool. This insight enables an inexperienced reviewer to rapidly acquire experience and intuition regarding concurrent bug patterns. A more experienced reviewer may use this information to critically review the decision making process of tool 44 in order to improve its performance. In some cases, the devil's advocate may request that the tool refocus on a different bug pattern.

Of course, the reviewer acting as devil's advocate may choose to accept or to ignore the suggestions made by tool 44. In some embodiments, tool 44 tracks the actions actually taken by the devil's advocate following the suggestions made by the tool. The tool typically uses this information to improve the quality of future suggestions. In some embodiments, the tool improves the effectiveness of future suggestions by taking into account whether a bug was actually revealed by a particular suggestion or by a particular bug pattern. In these embodiments, the devil's advocate typically indicates to tool 44 when a bug is discovered.

In some embodiments, tool 44 accepts directives from the devil's advocate, at a feedback step 68. This step is optional, and may be omitted in some embodiments. Devil's advocate directives may comprise, for example, a request to change the current bug pattern the tool is focused on to a different pattern. Other exemplary directives may comprise additions, deletions or modifications to bug patterns stored in database 52, definitions of suggestion-triggering events and specific parts of the program on which to focus.

In some embodiments, tool 44 updates database 52, at a database updating step 70. The database may be updated, for example, as a result of devil's advocate directives provided to the tool at step 68 above. Additionally or alternatively, the database can be updated as a result of new bugs being discovered under new circumstances that were not yet recorded as known bug patterns. Further additionally or alternatively, database 52 can be updated with a quantitative measure of the effectiveness of a particular bug pattern in finding bugs. This quantified effectiveness may relate to specific program components and/or system resources. In some embodiments, tool 44 can use the effectiveness measures for prioritizing the selection of bug patterns on which to focus. Having updated database 52, the method returns to monitoring step 60 above.

Note that the order of method steps shown in FIG. 2 above is an exemplary order. In alternative embodiments, different sequences of steps 60-70 above may be carried out as appropriate. For example, feedback step 68 may be carried out at any suitable time during the decision support process of FIG. 2. Similarly, database updating step 70 may also be carried out at any suitable time during the session.

Decision Support Examples

The following paragraphs show several examples of known concurrent bug patterns and the way they can be used to generate suggestions for actions to be taken by the devil's advocate, in accordance with the method of FIG. 2 above.

The first example refers to a situation in which a shared memory area is accessed by different threads. In this example, just before a lock is obtained on the shared memory by a given thread, or just after a lock is released, or just before or after a value is fetched by a thread from the shared memory, tool 44 suggests that the devil's advocate switches or freezes the currently-processed thread. Possible bug patterns in this case are a wrong scope definition of the lock, or a wrong assumption as to the visibility of variable changes due to the memory model used.

A second example refers to a bug pattern involving the Java methods notify( ) and wait( ). In Java, the notify( ) method related to an object awakens a thread that is waiting on a lock on this object. The wait( ) method causes a thread to release the lock it is holding on an object, allowing another thread to obtain it. If a notify( ) is executed before its corresponding wait( ), the notify( ) has no effect and is "lost." As a result, a thread executing a wait( ) may not be awakened because it is waiting for a notify( ) that occurred before the wait( ) was executed. In this bug pattern, the programmer implicitly assumes that the wait( ) operation will occur before any of the corresponding notify( ) operations, a condition that may not hold for some interleavings.

When processor 48 detects this pattern in the monitored session, tool 44 may suggest to freeze the currently-processed thread that includes the wait( ) operation. The tool indicates that the freeze is associated with the "lost notify" bug pattern, and suggests that the devil's advocate force the occurrence of a notify( ) before the thread containing the wait( ) is resumed.

A third example refers to a situation in which a wait( ) operation in the current thread is enclosed in an if statement, and a second thread is waiting for the lock on the object in question. In this situation, tool 44 may suggest to stop the current thread just before obtaining the lock. Then, the tool may suggest that the devil's advocate look for a third thread that will execute an additional notify( ) operation, and then advance the second thread waiting on the lock. The sought bug pattern in this case is a situation in which either the second or third thread changes the condition of the if statement for which the first thread is waiting.

For example, assume the object in question is a queue, and that the following code is run by at least two consumer threads and at least one producer thread:

```
lock(M);
if (isQueueEmpty( )) {
    wait(QueueIsEmpty, M)
}
takeInformationFromQueue( )
unlock(M)
``` wherein M denotes the queue.

Assume that in the course of the session the producer thread performs a notify( ) on the QueueIsEmpty condition after adding information to the queue. In such a case, tool 44 may suggest freezing one of the consumer threads just after performing the wait( ), freezing the producer thread after it adds the information to the queue and performs the notify( ), and allowing a second consumer thread to access the queue and take the information out of it. Finally, the tool would suggest unfreezing the first consumer thread and allowing it to take information out of the queue (which is now empty).

The example above can also be used to demonstrate how tool 44 can suggest different actions depending on whether previous suggestions are accepted or ignored by the devil's advocate. If, for example, after the first suggestion the session takes a different direction and the second consumer thread is about to obtain the lock, the tool would suggest freezing the second consumer thread before obtaining the lock, allowing the producer thread to perform the notify( ) and add the information to the queue, and then unfreezing the second consumer thread. The second consumer will then be allowed to take the information out of the queue. According to the suggestion, the first consumer thread should then be unfrozen and allowed to attempt to take the information out of the (empty) queue.

Although the embodiments described herein mainly address decision support during the review of multi-thread software programs, the principles of the present invention can be used in additional applications involving the reviewing and testing of multi-tasking, multi-input and/or multi-user applications. In such applications, bugs may be revealed or concealed as a result of different possible interactions among concurrent sub-processes.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for assisting a review session in respect to a computer program, comprising:
    monitoring the review session held by one or more reviewers for locating errors in the computer program, wherein the computer program is a concurrent program including multiple threads scheduled in alternation, wherein said monitoring the review session comprises receiving an input from a first portion of the one or more reviewers, based on the input, tracking at least one of program locations of the multiple threads and monitoring a usage status of a shared resource used by the multiple threads;
    automatically detecting a suggestion-triggering event in the monitored review session, the suggestion-triggering event is associated with a bug pattern selected from known bug patterns;
    responsively to the detected suggestion-triggering event, determining, a suggested action that is predicted to increase locating an error associated with the bug pattern, wherein the suggested action comprises at least one consecutive action based on the bug pattern; and
    outputting the suggested action to a second portion of the one or more reviewers.

2. The method according to claim 1, wherein monitoring the review session comprises monitoring a review of one or more interleavings, each comprising a respective sequence of concurrent events related to at least some of the multiple threads.

3. The method according to claim 2, wherein the suggestion-triggering event is selected from the group consisting of a access to the shared resource and a synchronization-related concurrent event.

4. The method according to claim 2, further comprises applying the suggested action, said applying the suggested action comprises at least one of increasing a contention on the shared resource, modifying a scheduling of the threads and performing a system-related action.

5. The method according to claim 1, wherein the at least one consecutive action comprises two or more consecutive actions based on a current bug pattern out of the known bug patterns.

6. The method according to claim 5, further comprising changing an identity of the current bug pattern to another bug pattern out of the known bug patterns responsively to at least one of the detected suggestion-triggering event and a directive provided by the one or more reviewers.

7. The method according to claim 1, further comprising updating the known bug patterns responsively to a directive provided by the one or more reviewers.

8. A system for assisting a review session in respect to a computer program, the system comprising:
    one or more reviewer terminals, which are arranged to interact with one or more reviewers holding the review session for locating errors in the computer program, wherein the computer program is a concurrent program including multiple threads scheduled in alternation; and
    a decision support tool, comprising:
        a memory, which is arranged to hold known bug patterns; and
        a processor, which is arranged:
            to monitor the review session by receiving an input from at least one of the one or more reviewers, based on the input, tracking at least one program location of the multiple threads and monitoring a usage of a shared resource used by the multiple threads,
            to automatically detect a suggestion-triggering event in the monitored review session, the suggestion-triggering event is associated with a bug pattern selected from known bug patterns,
            to determine responsively to the detected suggestion-triggering event a suggested action that is predicted to increase locating an error associated with the bug pattern, wherein the suggested action comprises at least one consecutive action based on the bug pattern, and
            to provide the suggested action to at least one of the one or more reviewers.

9. The system according to claim 8, wherein the processor is arranged to monitor a review of one or more interleavings, each comprising a respective sequence of concurrent events related to at least some of the threads.

10. The system according to claim 8, wherein the processor is arranged to perform at least one of tracking respective program locations of the multiple threads and monitoring a usage status of the shared resource so as to monitor the session.

11. The system according to claim 8, wherein the processor is arranged to detect the suggestion-triggering event by detecting at least one of a access to the shared resource, contention on the shared resource and a synchronization-related concurrent event.

12. The system according to claim 8, the processor is arranged to suggest to the one or more reviewers at least one of increasing a contention on the shared resource, modifying a scheduling of the multiple threads and performing a system-related action.

13. The system according to claim 8, wherein the processor is arranged to suggest two or more consecutive actions based on a current bug pattern out of the known bug patterns.

14. The system according to claim 13, wherein the processor is arranged to change an identity of the current bug pattern to another bug pattern out of the known bug patterns responsively to at least one of the detected suggestion-triggering event and a directive provided by the one or more reviewers.

15. The system according to claim 8, wherein the processor is arranged to update the known bug patterns responsively to a directive provided by the one or more reviewers.

16. A decision support tool for assisting a review session of a computer program, the decision support tool comprising:
   a memory, which is arranged to hold known bug patterns; and
   a processor, which is arranged:
      to monitor the review session held by one or more reviewers for locating errors in the computer program, wherein the computer program is a concurrent program including multiple threads scheduled in alternation, and wherein monitoring the review session comprises:
         to receive an input from at least one of the one or more reviewers holding the review session, based on the input:
            to track at least one program location of the multiple threads, and
            to monitor usage of a shared resource used by the multiple threads,
      to automatically detect a suggestion-triggering event in the monitored review session, the suggestion-triggering event is associated with a bug pattern selected from known bug patterns,
      to determine responsively to the detected suggestion-triggering event a suggested action that is predicted to increase locating an error associated with the bug pattern, wherein the suggested action comprises at least one consecutive action based on the bug pattern, and
      to provide the suggested action to at least one of the one or more reviewers.

17. A computer software product for assisting a review session of a computer program, the computer software product comprising:
   a non-transitory computer-readable medium, in which program instructions are stored, which instructions, when read by a computer, cause the computer:
      to monitor the review session held by one or more reviewers for locating errors in the computer program, wherein the computer program comprises a concurrent program includes multiple threads scheduled in alternation and wherein monitor the review session comprises receiving an input from at least one of the one or more reviewers, and based on the input, tracking at least one program location of the multiple threads and by monitoring usage of a shared resource used by the multiple threads,
      to automatically detect a suggestion-triggering event in the monitored review session, the suggestion-triggering event is associated with a bug pattern selected from known bug patterns,
      to determine responsively to the detected suggestion-triggering event a suggested action that is predicted to increase locating an error associated with the bug pattern, wherein the suggested action comprises at least one consecutive action based on the bug pattern, and
      to provide the suggested action to at least one of the one or more reviewers.

18. The product according to claim 17, wherein the instructions cause the computer to monitor a review of one or more interleavings, each comprising a respective sequence of concurrent events related to at least some of the multiple threads.

19. The product according to claim 18, wherein the instructions cause the computer to detect the suggestion-triggering event by detecting at least one of a access to the shared resource, contention on the shared resource and a synchronization-related concurrent event.

* * * * *